United States Patent
Thorpe et al.

[11] Patent Number: 5,899,235
[45] Date of Patent: May 4, 1999

[54] FERRULE

[75] Inventors: Jason Thorpe, Holmfirth; Philip C Dawson, Accrington, both of United Kingdom

[73] Assignee: Federal-Mogul Systems Protection Group Limited, United Kingdom

[21] Appl. No.: 08/817,973

[22] PCT Filed: Oct. 20, 1995

[86] PCT No.: PCT/GB95/02479

§ 371 Date: Apr. 28, 1997

§ 102(e) Date: Apr. 28, 1997

[87] PCT Pub. No.: WO96/13444

PCT Pub. Date: May 9, 1996

[30] Foreign Application Priority Data

Oct. 27, 1994 [GB] United Kingdom .................. 9421625

[51] Int. Cl.⁶ .................................................. F16L 57/00
[52] U.S. Cl. .......................... 138/96 R; 138/128; 29/432; 29/507; 29/513; 29/890.144; 156/273.7; 285/238; 285/257; 285/915
[58] Field of Search .................. 285/257, 23, 238, 285/253, 260, 915; 138/109, 96 R, DIG. 8, 128; 156/273.7; 29/890.15, 890.144, 507, 509, 511, 513, 432

[56] References Cited

U.S. PATENT DOCUMENTS

| | | | |
|---|---|---|---|
| 2,099,984 | 11/1937 | Lundquist | 285/238 |
| 3,030,130 | 4/1962 | Appleton | 285/257 X |
| 3,407,448 | 10/1968 | Tetzlaff et al. | 285/253 X |
| 3,911,960 | 10/1975 | Flimon | |
| 4,486,034 | 12/1984 | Sauer | |
| 5,015,015 | 5/1991 | Fetters | |

FOREIGN PATENT DOCUMENTS

A 2800735  7/1978  Germany.

Primary Examiner—Dave W. Arola
Attorney, Agent, or Firm—Nixon & Vanderhye P.C.

[57] ABSTRACT

A ferrule includes a tubular wall and end wall which is divided into radially extending fingers, each of which terminates at a barb member formed by deflecting a tapered end portion of the finger. The end wall fingers extend orthogonally to the longitudinal axis of the tubular wall and the barb members are each inclined at an acute angle to the carrying fingers and axis such that when a tubular body, such as a braided or like textile sleeve, is received in the tubular wall and the end all is swaged to cause the fingers to enter the body and lie flat against the tubular wall, the bars are caused to penetrate the body and be flattened by the tubular wall to point in the direction towards the body end and inhibit its removal. The tubular wall may be circumferentially continuous (annular) or discontinuous (slit) and openable.

21 Claims, 3 Drawing Sheets

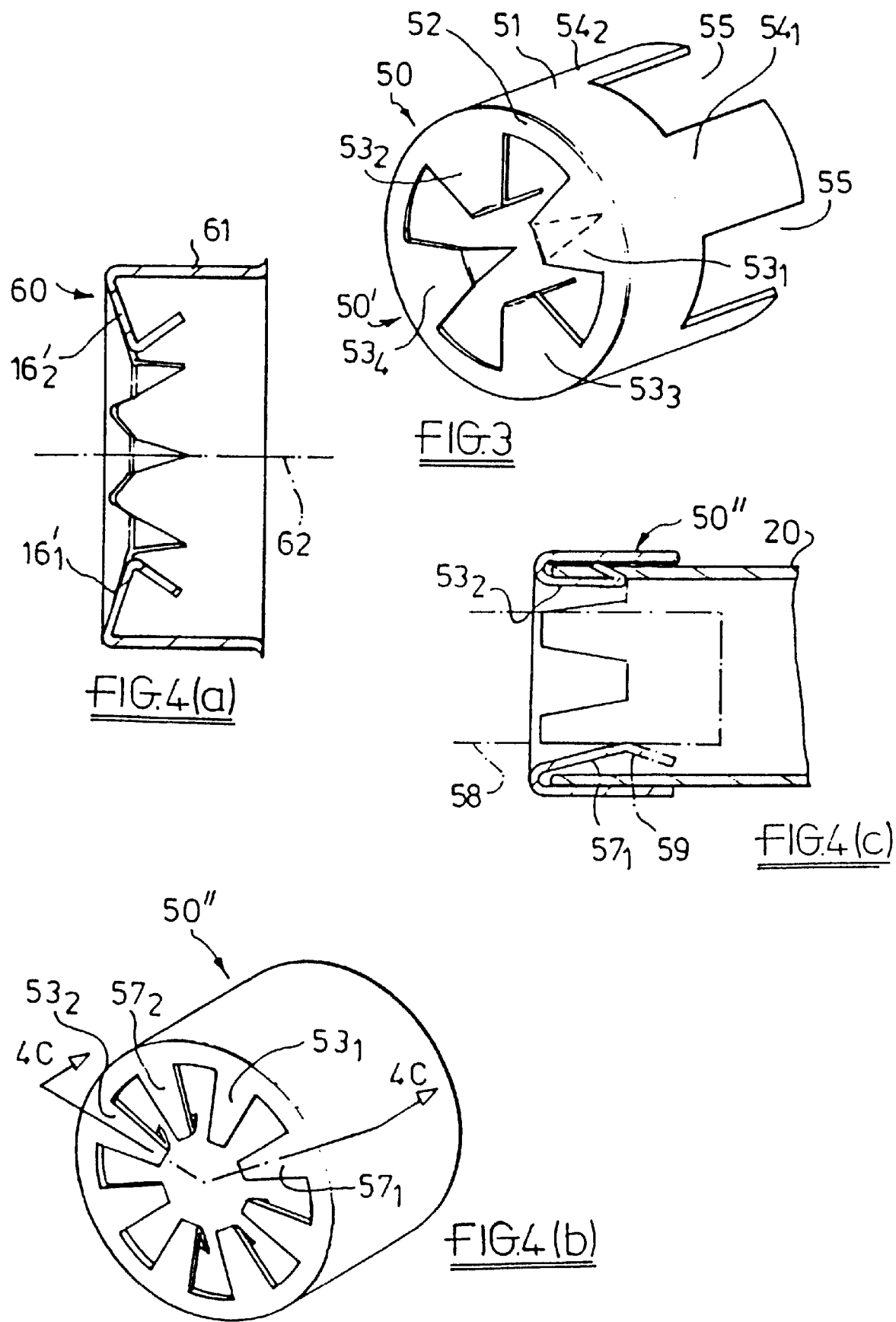

FERRULE

TECHNICAL FIELD

This invention relates to ferrules or cuffs and particularly to ferrules or cuffs for terminating sleeves, hoses or like tubular bodies.

BACKGROUND AND SUMMARY OF THE INVENTION

The invention is particular, but not exclusively, concerned with terminating such tubular bodies formed from filamentary or yarn materials that are braided, knitted or woven to form the tubular body. For convenience such a tubular body is referred to herein as a textile tubular body irrespective of the materials and/or construction.

It is a feature of such tubular bodies that the components thereof are movable relative to each other when the body is subjected to various forces and often the materials, such as filaments of glass fibres or plastics material which are smooth and/or exhibit shape memory, result both in a tendency for such bodies to fray at any cut ends and difficulty in capping them by traditional ferrule designs.

Such a traditional ferrule design comprises a metal cap having a tubular wall and an annular end face which is swaged against the tubular wall with the tubular body therebetween to crimp the body. A textile tubular body, particularly a thin walled one, is difficult to retain within such a simple ferrule.

It is known to terminate a tubular body, in joining fluid carrying hoses end-to-end or securing a component thereto, by having inner and outer parts which include radial projections that co-operate to crimp the tubular body. Such multi-part arrangements are usually employed with tubular bodies having a significant wall thickness which is amenable to such crimping but does not lend themselves to simple one-piece terminating ferrules.

Such an arrangement is disclosed in U.S. Pat. No. 5,015,015 which describes joining a pair of overlapping coaxial pipe segments by inserting between their respective inner and outer overlapping tubular surfaces a plurality of circumferentially short clips having radially oppositely inclined barbs which bite into and penetrate both pipe segments. The oppositely inclined barbs are also directed in opposite axial directions so that each is also inclined towards the end of the pipe wall it penetrates to preclude removal.

U.S. Pat. No. 3,911,960 describes an end piece for a tubular element such as a solid pipe, intended to be fitted thereto temporarily to avoid damage to the element surfaces at or near the ends due to handling of the element, including lifting by crane and hook. A tubular body or skirt is moulded to effect a tight encompassing fit on the end region of the tubular element and has an end face, arranged to overly the end of the element, which is divided into radially directed fingers to localise stress concentrations due to lifting by inserting a hook into the tubular element. The fingers are arranged, if necessary, to individually deflect and lie parallel to the inside wall of the tubular element under the action of a local lifting load to prevent damage by such hook. The end piece is not intended as a permanent termination and designed to be removed after use without damage to the tubular element, that is, without intruding into the surface of the tubular element in any way.

In this specification the term tubular body is intended to encompass both a body that is circumferentially continuous at manufacture and one that is circumferentially discontinuous, at least until the time of use and possibly in use, provided such body does in use assume a generally tubular shape for the purpose of defining an enclosure, albeit apertured. To this end it is known for a tubular member to be slit longitudinally such that is has longitudinally extending edges which are arranged to extend parallel to each other, either overlapping or spaced apart, to permit objects or materials to pass through the wall or to envelope such objects or materials; such longitudinally slit tubular members may be opened out and flattened for easy storage and assume a naturally tubular form or may have edge coupling means such that naturally flat material is curled into and maintained in, tubular form. It is also known for a tubular member to be defined by wrapping a flat strip helically about a core or former, with or without adjacent or overlapping edges secured to each other to define a tubular body.

It is an object of the present invention to provide a ferrule for, and a method of, terminating a tubular body, particularly a textile body, that is of simple one-piece construction and mitigates disadvantages of known arrangements. It is also an object of the present invention to provide a method of terminating and/or joining ends of a multi-layer tubular body.

The invention employs piercing of the tubular body and to this end is suited only for use with the above mentioned textile tubular body which has interstices between filamentary components or a cast or extruded tubular body of thermoplastics or other material whose walls are readily pierced, and within this specification the term "pierceable tubular body" is used in relation to such a body of manufactured or assembled tubular form having a structure that enables it to be pierced.

According to a first aspect of the present invention a ferrule or cuff for a pierceable tubular body (as herein defined) comprises a circumferentially continuous or discontinuous longitudinally extending substantially tubular wall, dimensioned to receive a said tubular body, and an annular end wall comprising a plurality of fingers arrayed about the end of the tubular wall and extending radially inwardly from an associated section thereof, each finger carrying a barb member inclined at an acute angle with respect to the finger and longitudinal axis and directed towards the associated section of the tubular wall, said end wall being swageable in use causing each said finger to lie parallel to its associated section of the tubular wall to enclose a portion of said tubular body therebetween and cause the barb member to penetrate the body and point generally in the direction of the end of the tubular body.

According to a second aspect of the present invention a method of terminating a pierceable tubular body (as herein defined) comprises assembling a ferrule as claimed in the preceding paragraph onto the end of the body with the body received in the tubular wall of the ferrule, swaging the end wall of the ferrule causing the fingers to bear against the inside of the body alongside the tubular wall and causing the barb member carried by each finger to pierce the body and upon penetration therethrough be deflected by the tubular wall to lie substantially parallel to the tubular wall and the finger and pointing towards the end of the body.

According to a third aspect of the present invention a method of terminating and/or joining multiple, coaxially disposed layers of a pierceable tubular body (as herein defined) comprises assembling a ferrule as defined in the last but one paragraph, and whose barb members are longer than the total wall thickness of the bodies, onto the end of the outer body such that all bodies are received adjacent the tubular wall of the ferrule, swaging the end wall of the ferrule causing the fingers to lie against the inside of the inner body alongside the tubular wall and causing the barb member carried by each finger to pierce the bodies and be deflected by the tubular wall to point toward the end of the outer body.

Embodiments of the invention will now be described by way of example with reference to the accompanying drawings.

BRIEF DESCRIPTION OF THE DRAWINGS

FIG. 3 is an isometric composite view of further ferrules in accordance with the present invention showing several variants on the basic structure including circumferentially spaced fingers and associated sections of tubular wall of full axial extent separated by sections of lesser axial extent, FIG. 4(a) is a sectional elevation of a ferrule similar to FIG. 1(a) but showing an alternative disposition of fingers, FIG. 4(b) is an isometric view of a modified form of the ferrule of FIG. 3 prior to swaging onto a tubular body, showing the addition of unbarbed leaf elements between spaced barbed fingers, FIG. 4(c) is a sectional elevation through the ferrule of FIG. 4(b) taken along the line c—c of FIG. 4(b) and after swaging onto a tubular body and illustrating mounting of the ferrule onto a projection of lesser cross-section than the tubular body.

Referring to FIG. 1(a) and 1(b) a ferrule 10 in accordance with the present invention comprises a mild steel blank drawn into a cup having a tubular wall 11 extending about a longitudinal axis 12 and an integral annular end wall 13. The end wall is punched to provide a central aperture 14 and radial slits 15 which define a plurality of radially extending and tapered fingers $16_1$, $16_2$ . . . each associated with a section $11_1$, $11_2$, of the tubular wall.

Figure 1A:
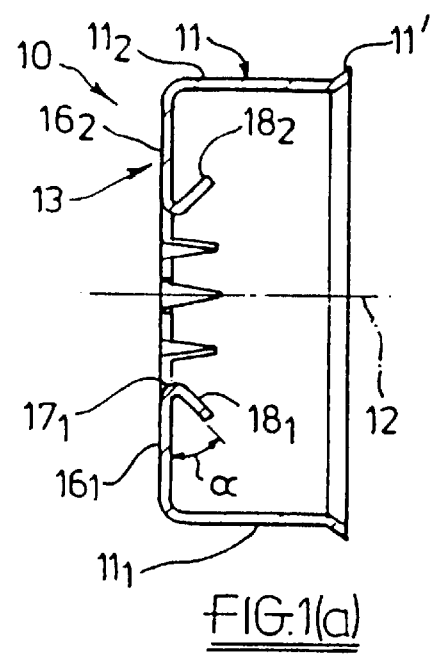
FIGS. 1(a) and 1(b) are sectional and end elevational views respectively of a ferrule in accordance with the present invention.

The slits 15 terminate a short distance from the tubular wall and the fingers terminate at $17_1$, $17_2$ . . . a short distance from the central aperture. Each finger, such as $16_1$, carries a barb member $18_1$, which is conveniently integral with the finger and formed by deforming the apex of the finger, between the termination $17_1$, and the central aperture 14 and shown ghosted in FIG. 1(b), out of the plane of the finger such that it assumes an acute angle a with respect to the finger and directed towards the associated section $11_1$ of the tubular wall and pointing away from the end wall, notwithstanding that the acute angle $\alpha$ with respect to the finger is obtained by bending the end portion thereof from the plane of the finger through an angle in excess of 90°.

The end wall 13, and thus each finger thereof, extends substantially orthogonally to the longitudinal axis 12 and each barb member is inclined with respect thereto and with respect to the tubular wall at substantially 45°.

Preferably the barb member, although pointed, is truncated at its end to an extent determined by the diameter of the central aperture 14.

In the form illustrated there are ten fingers, each tapered towards the longitudinal axis at an included angle of approximately 30°.

The end 11' of the tubular wall may be flared slightly to encourage reception of a tubular body into the ferrule. Referring also to FIG. 1(c), in operation, a textile tubular body 20, such as thin walled sleeving made from a braided or woven filamentary material and having an outside diameter substantially equal to the inside diameter of the tubular wall 11, is inserted into the ferrule into abutment with the end face 13. The end face is then swaged to force it to enter the bore of body 12 such that the individual fingers $16_1$, $16_2$ . . . are forced flat against the sleeving to lie parallel to the associated section $11_1$, $11_2$ . . . of the tubular wall to enclose a portion of the sleeving 20 therebetween and effect clamping of the sleeving. In such swaging operation, as each finger is forced towards becoming parallel with the tubular wall, the barb member carried thereby becomes inclined with respect to the tubular wall 11 at approximately 45° such that it now points generally in the direction of the erstwhile end wall 13 and the end of the sleeving 20, the barb member being caused to pierce and penetrate the sleeving wall until it engages the section of tubular wall associated with the carrying finger, whereupon the swaging pressure causes deflection of the barb member to lie substantially parallel to the tubular wall and the finger.

It will be appreciated that by piercing the fabricated structure of the sleeving and then being deflected to point towards the end of the sleeving, the ferrule is prevented from slipping from the end of the sleeving without considerable effort necessary to un-braid the sleeving about the barb members.

Although the ferrule as described is particularly suited to thin walled textile tubular bodies employing filaments or yarns which are braided, knitted or woven and prone to fraying, it may be employed with thicker and/or other pierceable materials, possibly incorporating the above.

Figure 1B:
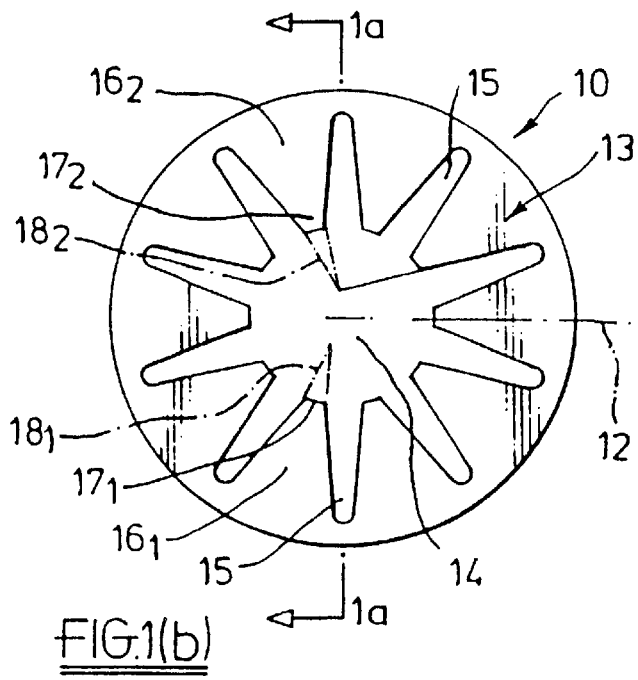
Figure 1C:
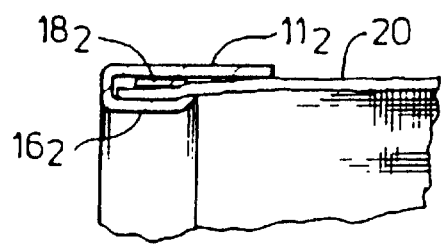
FIG. 1(c) is a portion of the sectional elevation of FIG. 1(a) showing the ferrule operatively disposed in terminating a tubular body of braided sleeving and relatively small wall thickness.
Figure 1D:
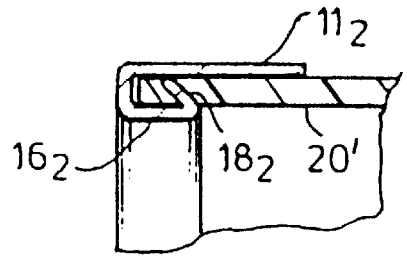
FIG. 1(d) is a portion of the sectional elevation of FIG. 1(a) showing the ferrule operatively disposed in terminating a tubular body of thermoplastics material having a relatively large wall thickness.

Referring to FIG. 1(d) this shows a partial sectional elevation similar to FIG. 1(c) but in which the ferrule is shown swaged onto the end of a thicker walled tubular body 20'. In this case the barb member $18_2$ has pierced the body and become embedded in it, but has not been flattened by engagement with the tubular wall section $11_2$ of the ferrule.

It will be seen that, subject of course to the material of the body not having a tendency to tear, the ferrule is securely located on the end of the body and prevented by the barb members from removal. Although the barb member may be of such a length as to penetrate only part way through a tubular body which it pierces, preferably it is of such length as to penetrate the body and make engagement with the tubular wall 1 even if it is not caused to flatten against it.

Figure 1E:
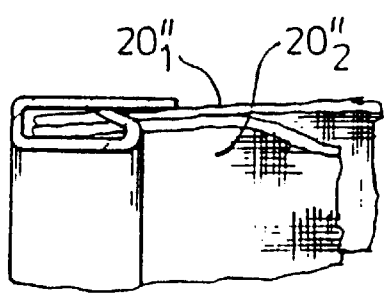
FIG. 1(e) is a portion of the sectional elevation of FIG. 1(a) showing the ferrule operatively disposed in terminating a tubular body comprising a multi-layer disposition of co-axial braided sleeves.

Referring to FIG. 1(e) which is somewhat similar to FIG. 1(c), it will be appreciated that the ferrule may be adapted to provide a termination for a multi-layer tubular body, such as is provided by a coaxial arrangement of braided sleeves $20''_1, 20''_2, \ldots$. The barb members are arranged to be longer than the total wall thickness of the tubular body and operation is as described above with the outer sleeving being received in the tubular wall and the fingers swaged to lie against the inner sleeving. The component layers of the body are not only each terminated by a ferrule but are clamped with respect to each other such that parts remote from the ferrule may be expanded or contracted radially to different extents. It is even possible for an outer sleeving to be everted over the ferrule and be separated longitudinally from any inner ones, that is, with such ferrule effecting a joint between sections of sleeving.

It will be appreciated that the forms taken by many parts of the ferrule are open to variation.

For instance, as shown in FIG. 1(a) it is convenient for the barb members to be inclined to both the finger and the longitudinal axis at substantially 45°. However, it will be appreciated that a barb member inclined at any acute angle with respect to the finger such that it has sufficient inclination to pierce or penetrate most body materials, but is sufficiently shallow to be deflected by engagement with the tubular wall upon penetration through the body when the finger assumes substantial parallelism with the tubular wall, is suitable.

The length of each barb member is open to variation, in dependence on the thickness of tubular body to be pierced and/or it structural form. Each barb member may be made longer by compromising on the length of the finger it is integral with by varying the radius from axis 12 which the deformation edge 17 is formed. If desired, each barb member may be other than integral with the carrying finger, being secured thereto in some way, in which case there is a wider choice of materials and dimensions and forms.

Figure 2A:
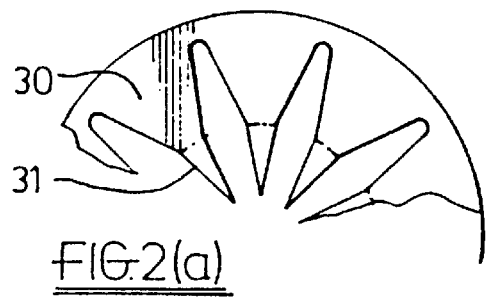
FIG. 2(a) is and end view of a portion of a ferrule showing a further form of shaping of fingers and barb members.
Figures 2B, 2C:
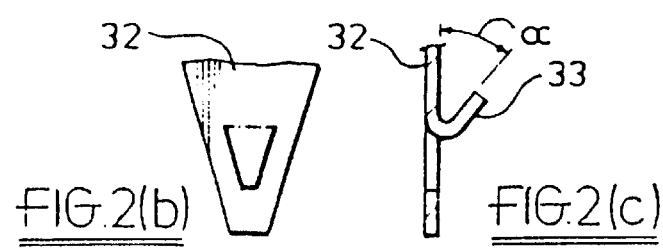
FIG. 2(b) is an end view of a ferrule showing an alternative form of finger and barb member.
FIG. 2(c) is a side view of the finger and barb member of FIG. 2(b)

It will also be appreciated that where the barb members are formed integrally with the fingers, the shape thereof, and thus the ability to pierce a tubular body, may be chosen, for instance as shown in FIG. 2(a) with a different taper to the finger 30 and its tip portion 31 to be deformed into the barb member. FIGS. 2(b) and 2(c) illustrate in front and elevation views respectively an alternative form of finger 32 in which the barb member 33 is pressed from within the finger rather than an extension thereto.

The shape, number and disposition of fingers is also open to variation, as is the form of the tubular wall. In ferrule 10 shown in FIG. 1 the number of fingers may be increased or decreased, the angle of taper of each being correspondingly varied.

FIG. 3 shows a composite isometric view of further forms of ferrule 50 and 50'. The ferrule 50 comprises a tubular wall 51 and end face 52 which includes a plurality of fingers $53_1$, $53_2$ separated circumferentially. Each finger is associated with a section $54_1$, $54_2$ respectively of the tubular wall. Between each such section the tubular wall is cut away or recessed, as shown at 55. Swaging the end wall with respect to the tubular wall suitably radially supported permits each finger and the barb member it carries to bear against its associated section but the separation of sections permits flexing of the ferrule and/or a possible reduction in ferrule material. Irrespective of spacing between the fingers, that is, even if the fingers are more closely spaced as in ferrule 10 of FIG. 1, the associated sections of the tubular wall may be separated along part of their length by through-recesses of appropriate width in the tubular wall.

Also illustrated in the Figure, in ferrule 50', such circumferentially separated fingers may take any shape, as shown for fingers $53_3$ and $53_4$, provided that the barb members carried thereby, and formed integrally therewith or otherwise, have the appropriate taper and inclination with respect to the tubular wall to permit them to pierce a tubular body with which the ferrule is used.

Whether or not the tubular wall of the ferrule is circumferentially discontinuous for its whole length, it may be flared along all or a significant part of its axial length to facilitate positioning onto a tubular body prior to the swaging operation.

As shown in FIG. 4(a) the ferrule 60 has the fingers $16'_1$, $16'_2 \ldots$ of the end wall formed so that they are inclined with respect to the tubular wall 61 at less than 90°, in which case the angle of inclination of each barb member $18'_1, 18'_2 \ldots$ with respect to the carrying finger is adjusted to such that its inclination with respect to the longitudinal axis 62 and the tubular wall is within the useful range that permits it both to pierce the received tubular body and upon penetration therethrough, to be deflected by the tubular wall.

It will be appreciated that the ferrule provides a discontinuous, but rigid, lining for the inner end region of the tubular body and a continuous (or possibly discontinuous) rigid lining for the outer end region, enabling the body to be readily 'plugged' onto a projection or into a recess to retain it and the tubular body with respect to some other component.

In respect of one particular structure by which a ferrule-terminated sleeve may be 'plugged' onto a projection, FIGS. 4(b) and 4(c) show a modified form 50" of the arrangements of FIG. 3 in which, between the circumferentially separated fingers $53_1 \ldots$ shown in that Figure, axially and radially extending leaf elements $57_1 \ldots$ are provided. Such leaf elements $57_1$ are unbarbed and deflected or swaged in a similar manner to, but to a lesser extent than, the barbed fingers in attaching the ferrule to a tubular body 20 so that they remain inclined radially with respect to the inner wall of the tubular body and define a mounting aperture of lesser diameter than the tubular body. When the ferrule is passed over a projection, shown ghosted at 58, larger than the mounting aperture the leaf elements are deflected radially by the projection and retain the ferrule with respect thereto. The leaf elements may terminate at an edge that effects engagement with the projection, permitting ready assembly but impeding removal, or may include an intermediate bend, as shown ghosted at 59, permitting both ready assembly and removal.

It will be appreciated that the ferrule may have its tubular wall adapted for co-operation with other mechanical components, for instance by having a screw thread or carrying attachments or attachment means.

The ferrule, although conveniently and inexpensively formed from mild steel which has ductility suitable for forming the cup by drawing and punching and provides both the rigidity of the barb members in piercing the tubular body and the permanent deflection of the barb members by the tubular wall upon penetration of the body, variation to the above may permit other materials to be employed and/or provide a more secure grip on the tubular body.

For example, the interior of the tubular wall sections and/or the barb members may be coated with an adhesive material of the impact, thermosetting or thermoplastic type such that when the barb members are pressed flat by and against the tubular wall they bond thereto and, being connected both to the fingers and wall, help resist subsequent deflection of the fingers away from the tubular wall. It will be appreciated that such an arrangement may be employed with resilient materials not suited to use with swaging alone, such as metals or metal alloys or thermoplastics materials. It will also be appreciated that with appropriate materials, such as thermoplastics materials, such barb members may be bonded to the tubular wall by welding, using thermal, vibration, pressure or other techniques, alone or possibly in addition to the use of an adhesive.

As mentioned hereinbefore, the tubular body may comprise one that is circumferentially discontinuous by virtue of a longitudinally extending slit. Such bodies are known for the purposes of passing materials through the wall thereof or assembling around materials and such bodies are often formed including bodies of textile materials, as a flat strip which permits coiling for storage and, when uncoiled, have a predisposition to curl longitudinally into such a tubular body.

Clearly such a strip, after the end thereof has been permitted to curl, may be treated as a simple tubular body and inserted into the tubular wall of a ferrule type described above and secured thereto by deforming the fingers of the ferrule such that the barb members thereof pierce the slit tubular body. The edges of the slit may be spaced apart within the ferrule or overlap such that within the ferrule, the tubular body is completely enclosed and permits seaming or other forms of joining of the edges away from the ferrule.

Figure 5A:
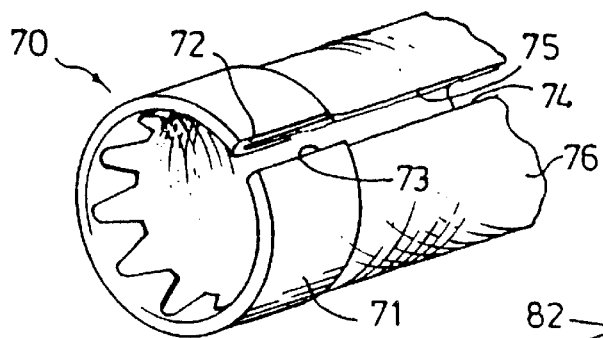
FIG. 5(a) is an isometric view of an alternative form of ferrule in accordance with the present invention in which the ferrule and tubular body are circumferentially discontinuous and a longitudinal slit exists between edges thereof.

As discussed above, it is necessary sometimes for the tubular body to be circumferentially discontinuous and contain a longitudinal slit to enable materials, such as wires, cables or pipes, to be inserted into, or branch out of, the tubular body which is used as a sleeving. To this end, it may be appropriate for such a longitudinal slit to extend to the ferrule itself such that the tubular body of the ferrule is itself circumferentially discontinuous, coextensively with a circumferentially discontinuous tubular body, to permit the ferrule itself to be able to accept passage of items by way of the tubular wall and/or permit temporary or permanent adjustment of effective cross-section in use by varying the relative position of the longitudinally extending walls. Referring to FIG. 5(a) it can be seen that for a ferrule 70 having a tubular wall 71, longitudinally extending edges 72, 73 of a discontinuity may lie in the same plane but spaced apart, being coextensive with the edges 74, 75 of a slit tubular member 76.

Figure 5B:
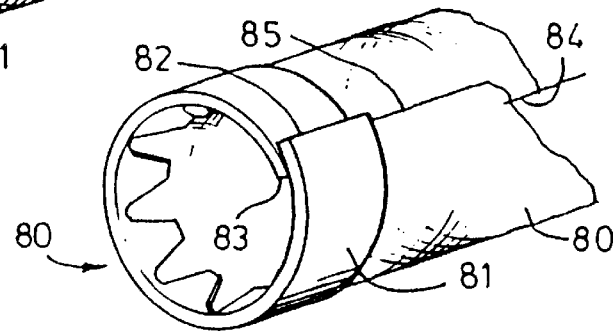
FIG. 5(b) is an isometric view similar to FIG. 5(a) but in which the longitudinally extending slit edges of the ferrule and tubular body overlap.

FIG. 5(b) shows a similar arrangement for ferrule 80 having a tubular wall 81 in which longitudinally extending edges 82 and 83 overlap circumferentially and along with edges 84, 85 of tubular body 86, permitting the ferrule to expand radially to fit over a projection, or contract radially to fit into a recess, as discussed hereinbefore.

Such a circumferentially discontinuous ferrule may also be of any polygonal cross-section and have surface features for attachment to other components and/or means to secure the longitudinally slit ends, or adjacent regions to each other to form an effectively circumferentially continuous tubular wall.

Such a circumferentially discontinuous ferrule may be formed into its final tubular form in manufacture and used in the manner described for all of the above embodiments, the only proviso being that longitudinally extending edges of the tubular wall are aligned with corresponding edges of a tubular body with which used.

Figure 6:
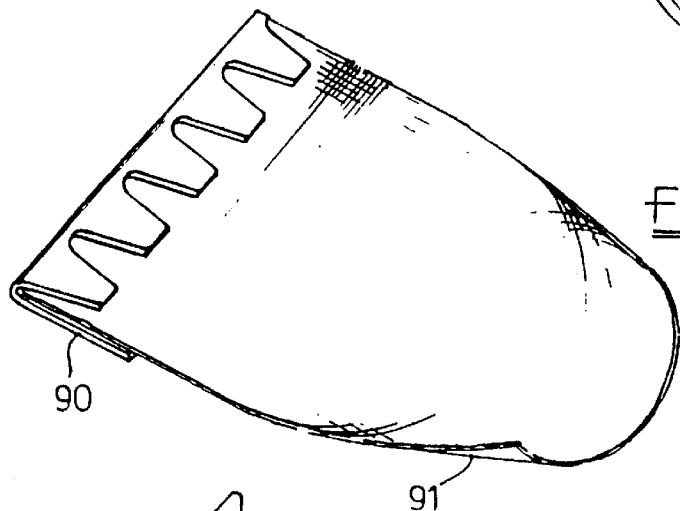
FIG. 6 is an isometric view of an intermediate stage in providing the ferrule and tubular body of FIG. 5(a) or 5(b) in which the ferrule and body are joined in flattened form prior to resuming or assuming the tubular form.

It will be appreciated that when a circumferentially discontinuous ferrule is formed from materials suitable for deforming from a naturally curled to flattened state, or vice versa, then as illustrated by FIG. 6 the ferrule 90 may be secured to the end of a flattened out, slit tubular body 91 and thereafter permitted to resume, or be caused to assume, the circumferentially incomplete tubular form of FIGS. 5(a) or 5(b).

Figure 7:
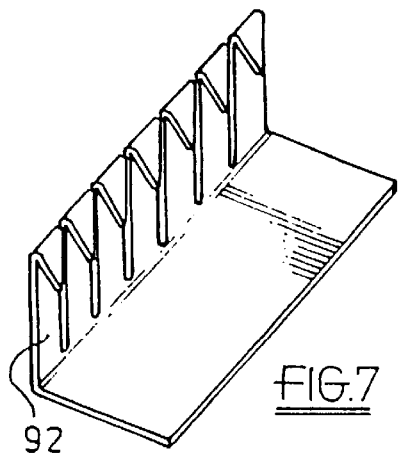
FIG. 7 is an isometric view of an alternative form of the ferrule of FIG. 6 showing how the barb carrying fingers may take other forms not constrained by a tubular form prior to swaging.

It will also be seen from FIG. 7 that employing such a scheme, in which the fingers 92 are folded flat prior to assumption of tubular form, the fingers may be of simple rectangular form and not necessarily tapered, as is required with the fingers 16 of ferrule 10.

Figure 8:
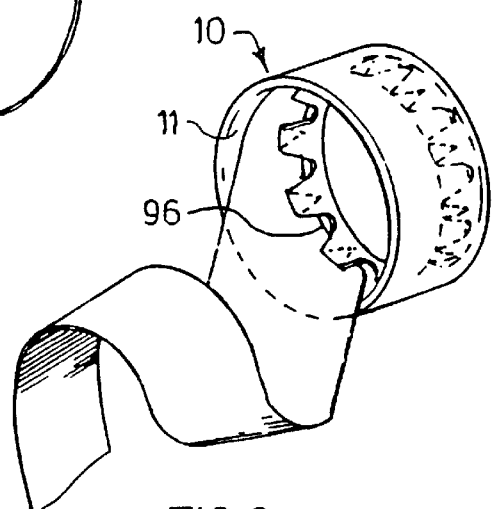
FIG. 8 is an isometric view of the ferrule of FIG. 1(a) and (b) employed in terminating and defining a tubular body from a flat strip intended for wrapping helically about a core or the like extending through the ferrule in order to complete the tubular body.

Such a ferrule or cuff as shown in any of the above embodiments may be employed in respect of both defining at least the end of a tubular body, and terminating the end thereof, from a flat strip of material that is intended, in operation, to be wound helically about a core which extends through the tubular end region defined and terminated by the ferrule. Referring to FIG. 8 which shows such a flat strip 95 whose end region is trimmed obliquely to its longitudinal direction at 96 and wound into circumferentially incomplete tubular form and disposed within the tubular wall 11 of a ferrule 10 whose fingers and barb members are swaged flat and held against the tubular wall to hold the tubular body end so formed. The ferrule may be circumferentially continuous, as shown, or of the circumferentially discontinuous form shown in FIG. 5(a)–7.

The circumferentially discontinuous forms of ferrule may be employed to terminate a tubular body having multiple layers substantially as described hereinbefore.

Also, although the ferrule is illustrated in both circumferentially continuous or discontinuous forms as being of, or assuming, circular cross-section it may be chosen to have any particular polygonal section having a corresponding number and disposition of fingers, either to conform to a tubular body of such polygonal cross-section or to define such a shape to the end of a flexible tubular member.

We claim:

1. A ferrule for terminating a pierceable tubular body, said ferrule comprising a longitudinally extending tubular wall dimensioned to receive an end of the tubular body, and terminating in an annular end wall comprising a plurality of fingers arrayed about one end of the tubular wall, each finger extending radially inwardly from said one end of said tubular wall each said finger carrying a barb member inclined at an acute angle with respect to the finger and directed towards the associated section of said longitudinally extending tubular wall, said annular end wall adapted to be swaged, when the ferrule is axially positioned on the end of the tubular body, to cause all of said plurality of fingers to lie parallel to the respective associated sections of said longitudinally extending tubular wall, with a portion of the tubular body radially between the tubular wall and said plurality of fingers, and to cause each barb member to penetrate the tubular body and point generally in the direction of the end of the tubular body to thereby attach the ferrule permanently to the tubular body.

2. A ferrule as claimed in claim 1 in which said barb is arranged to be deflected by engagement with the said associated section of the longitudinally extending wall upon swaging of the fingers to lie substantially parallel to said longitudinally extending wall and finger.

3. A ferrule as claimed in claim 1 in which said barb member is formed integrally with the finger.

4. A ferrule as claimed in claim 1 in which said barb is formed at a radially inner end of the finger.

5. A ferrule as claimed in claim 1 in which each finger carrying a barb member is tapered and the barb member carried thereby comprises an integral continuation of the finger at its radially inner end deflected out of the plane of the finger.

6. A ferrule as claimed in claim 5 in which the angle of the taper of the finger is substantially equal to the angle of taper of the barb member carried thereby.

7. A ferrule as claimed in claim 5 in which the barb member is truncated.

8. A ferrule as claimed in claim 1 in which each said finger of the end wall is disposed to extend, prior to swaging, substantially orthogonal to the longitudinal axis of said longitudinally extending tubular wall.

9. A ferrule as claimed in claim 8 in which each said barb member is inclined to the finger, prior to swaging, at an acute angle in the range 30° to 80°.

10. A ferrule as claimed in claim 1 and further comprising a plurality of leaf elements arrayed about said one end of said longitudinally extending tubular wall, each leaf element disposed between a pair of said fingers, said leaf elements adapted to surround the tubular body, and to extend along and inclined to the longitudinally extending tubular wall, terminating within the tubular body and operable to support the ferrule on a projection extending parallel to, but of lesser cross-sectional area than, said tubular body.

11. A ferrule as claimed in claim 1 in which at least one of said barb members and said associated sections of tubular wall disposed to deflect said barb members carry an adhesive material operable to bond the swaged barb members to the associated sections of tubular wall.

12. A ferrule as claimed in claim 1 in which the ferrule comprises a drawn steel cup punched to form said fingers and barb members.

13. A method of terminating a pierceable tubular body comprising: providing a ferrule having a longitudinally extending tubular wall dimensioned to receive an end of the tubular body, and terminating in an annular end wall comprising a plurality of fingers arrayed about one end of the tubular wall, each extending radially inwardly from said one end of said tubular wall, each finger carrying a barb member inclined at an acute angle with respect to the finger; assembling the ferrule onto the end of the tubular body with the body received against the longitudinally extending tubular wall of the ferrule; swaging the annular end wall of the ferrule causing the fingers to bear against the inside of the tubular body alongside the longitudinally extending tubular wall and causing the barb member carried by each finger to pierce the tubular body and, upon penetration therethrough, be deflected by the longitudinally extending tubular wall to lie substantially parallel to the tubular wall and the finger and pointing towards the end of the tubular body.

14. A method as claimed in claim 13 including bonding the barb member to the longitudinally extending, wall.

15. A method as claimed in claim 14 including disposing a pressure sensitive adhesive on at least one of said cooperating barb members and longitudinally extending tubular wall and applying pressure between the barb members and longitudinally extending tubular wall both to effect deflection of the barb members and bonding of the adhesive.

16. A method as claimed in claim 13 including disposing a thermoplastic or thermosetting adhesive on at least on of said barb members and longitudinally extending tubular wall and applying heat thereto subsequent to deflection of the barb members by the longitudinally extending tubular wall.

17. A method as claimed in claim 13 including, subsequent to deflection of barb members by the longitudinally extending tubular wall to lie thereagainst, applying heat to weld the barb members to the longitudinally extending tubular wall.

18. A method as claimed in claim 13 including forming the longitudinally extending tubular wall of the ferrule as circumferentially incomplete and securing a flattened strip of tubular body material thereto in a similarly flattened state prior to causing the longitudinally extending tubular wall and body to assume a circumferentially discontinuous tubular form.

19. A method of terminating multiple layers of a pierceable tubular body comprising: providing a ferrule having a longitudinally extending tubular wall dimensioned to receive an end of the tubular body, and terminating in an annular end wall comprising a plurality of fingers arrayed about one end of the tubular wall, each extending radially inwardly from said one end of said tubular wall, each finger carrying a barb member inclined at an acute angle with respect to the finger, wherein each barb member is longer than a total wall thickness of said multiple layers; assembling the ferrule onto the end of an outer layer of said multiple layers of said tubular body such that all of said multiple layers are received adjacent the longitudinally extending tubular wall of the ferrule; swaging the annular end wall of the ferrule causing the fingers to lie against the inside of an inner layer of said multiple layers of said tubular body alongside the longitudinally extending wall and causing the barb member carried by each finger to pierce the layers and be deflected by the longitudinally extending wall to point toward the end of the outer layer of the tubular body.

20. A ferrule for terminating a pierceable tubular body, said ferrule adapted for attachment to an end of a flat strip of material adapted to be formed into the tubular body, the ferrule comprising a flat wall section adapted to engage an outer surface of the flat strip and a plurality of fingers extending from one end of said flat wall section and adapted to be folded over an inner surface of the flat strip so as to lie inside the tubular body when the flat strip is reformed into the tubular body, and wherein each finger carries a barb member folded with an acute angle relative to the finger.

21. A combined ferrule and tubular body to which the ferrule is attached wherein the ferrule comprises a tubular wall dimensioned to receive an end of the tubular body, and terminating in an annular end wall comprising a plurality of fingers arrayed about the end of the tubular wall, each finger extending radially inwardly from an associated section of said tubular wall, and each said finger carrying a barb member inclined at an acute angle with respect to the finger and directed towards the associated section of longitudinally extending wall, said end wall swaged such that all of the fingers lie together parallel to the respective associated sections of the longitudinally extending tubular wall, with each barb member penetrating the tubular body and pointing generally in the direction of the end of the body to attach the ferrule permanently to the tubular body.

* * * * *